UNITED STATES PATENT OFFICE.

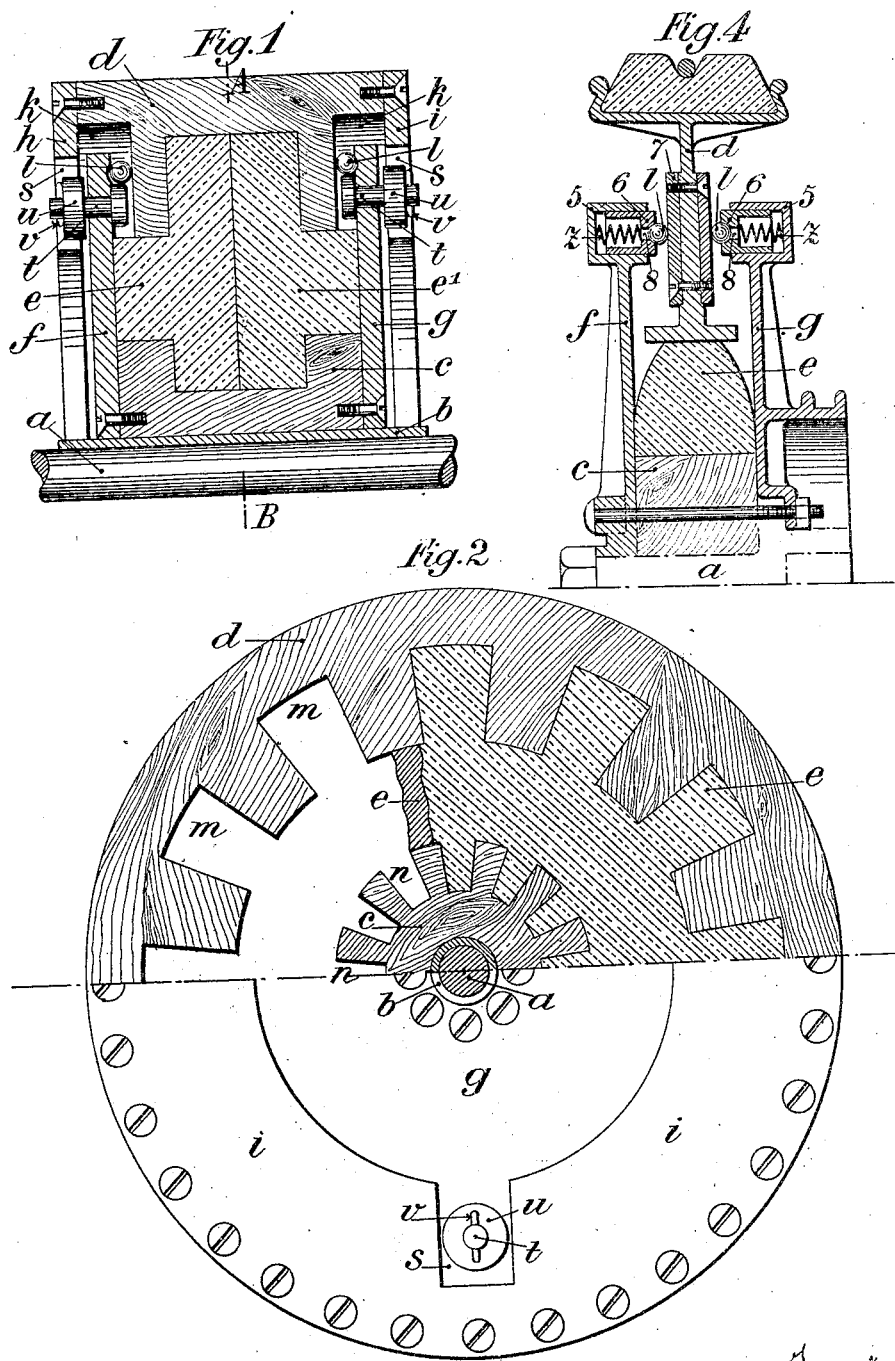

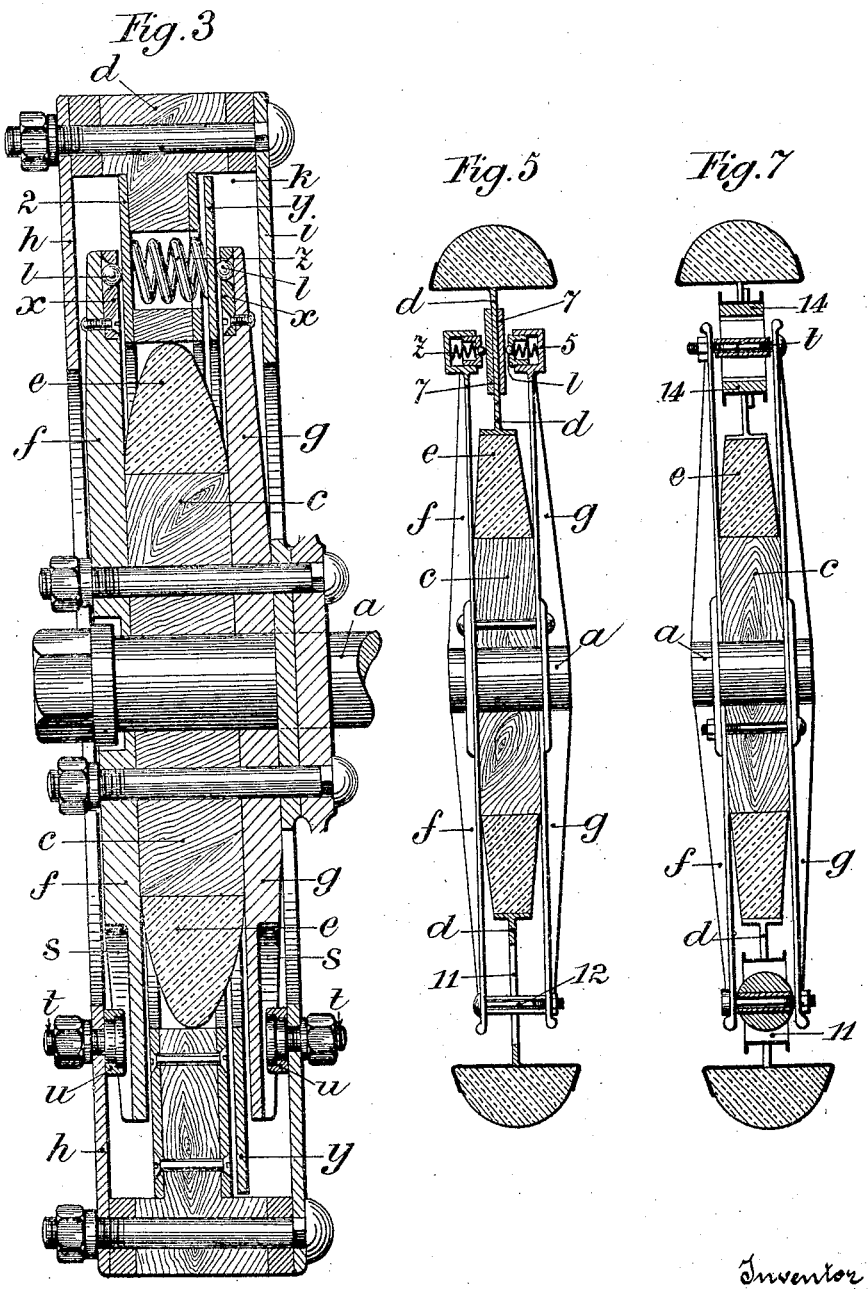

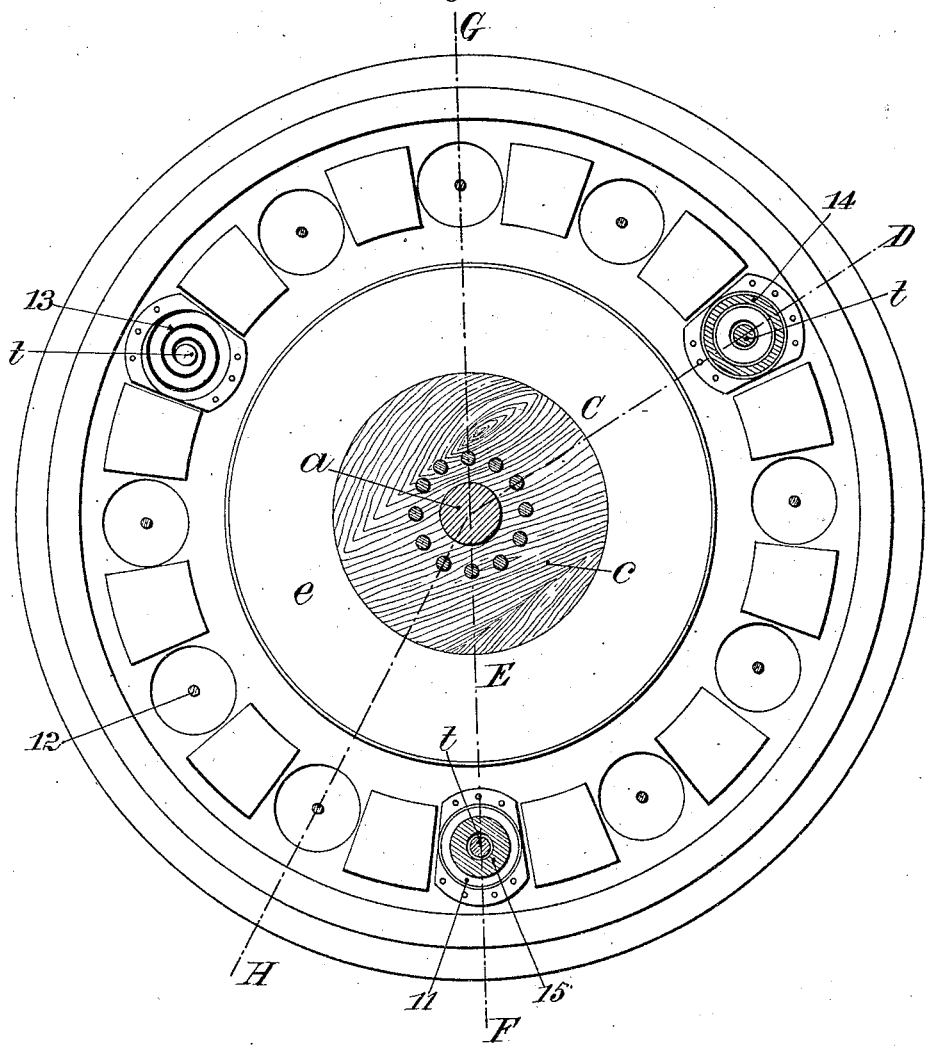

LOUIS ANTOINE GARCHEY, OF PARIS, FRANCE.

ELASTIC WHEEL.

No. 876,537.  Specification of Letters Patent.  Patented Jan. 14, 1908.

Application filed March 6, 1906. Serial No. 304,591.

*To all whom it may concern:*

Be it known that I, LOUIS ANTOINE GARCHEY, engineer, a citizen of the French Republic, and resident of Paris, France, have invented certain new and useful Improvements in Elastic Wheels, of which the following is a specification.

This invention relates to elastic wheels the hub of which is composed of two annular concentric parts separated by a space in which are located the devices or means for making the wheel elastic serving at the same time for imparting the movement of the one part to the other part.

Contrary to what has been done up to the present, the hub, according to this invention, comprises a guiding device and a device for transmitting the movement which are however constructed in such a manner that they do not interfere with the elasticity of the wheel although securing for the wheel a stability in vertical direction which has hitherto not been attained in wheels with elastic hubs.

Reference being had to the accompanying drawings:—Figure 1 represents in a section through the axle one form of construction by way of example. Fig. 2 shows in its upper part a section on line A—B of Fig. 1 and in its lower part a front view. Figs. 3 & 4 show modified constructions. Fig. 5 is a section on line G—H of Fig. 6. Fig. 6 is a front view and Fig. 7 represents in its upper part a section on line C—D and in its lower part a section on line E—F of Fig. 6.

$a$ is the axle and $b$ represents the metal bush of the hub. The hub is composed of two concentric rings $c$ and $d$ of wood or other suitable material, which are not connected with each other by any rigid part. One ring is taken along by the other ring by means of an elastic body $e$ placed in the annular space between the two rings. When the strain or torsion exerted on this body $e$ exceeds however the limit, the action of the elastic body is automatically taken up by a mechanical device, which again ceases to work when the strain or tension has gone back to the normal state.

To prevent the displacement of the parts $c$ and $d$ in the direction of the axle, each part is provided with two flanges the ends of which overlap. The flanges $f$ and $g$ are fixed to ring $c$ by means of screws, bolts or any other suitable means, the flanges $h$ and $i$ being fixed in the same manner to the outer end of ring $d$. This outer end of ring $d$ is slightly larger than the end of the ring nearest to the axle, so that recesses $k$ are formed, in which the flanges $f$, $g$ of part $c$ can slide. Balls $l$ are inserted between the ends of flanges $f$, $g$ and the inner end of ring $d$ and such ball-bearings may also be provided between the flanges $h$, $f$ and $i$, $g$ respectively. It is obvious, that by the hereinbefore described arrangement the two rings $c$, $d$ are secured in a parallel position to axle $a$ without being impeded in any way from displacement in radial or circumferential direction.

The elastic body $e$ is preferably made of india-rubber and, as shown in Figs. 1 & 2, provided with radial projections engaging with corresponding indentations $m$ in the inner periphery of ring $d$ and indentations $n$ in the outer periphery of ring $c$.

The shape of the elastic body $e$ may be varied in many ways. The elastic body may be solid or hollow, it may be in one piece or in several pieces, or, as shown in Fig. 6, it may consist of a ring of spheres connected by annular links.

As long as the tangential strain of one of the rings $c$, $d$ on the other remains below a predetermined limit, the taking along is only effected by the elastic body $e$, but when this limit is reached, the following device enters into operation.

The flanges $h$, $i$ are each provided at a symmetrical point with a window $s$, (Figs. 1 & 2). Opposite the center of these windows pivots $t$ are screwed into the flanges $f$, $g$, having rollers $u$ mounted on them which are secured in their position on the pivots by pegs $v$. The difference between the width of the windows and the diameter of the rollers $u$ is calculated corresponding to the limit of tangential strain which is not to be exceeded. It results herefrom that, as long as the strain remains below this limit, the taking along is effected only by the elastic body $e$, but as soon as this limit has been reached, the rollers $u$ are pressed against the flanges $h$ or $i$ respectively and the rollers now effect the taking along of one of the rings with the other. It is obvious, that this arrangement allows the rings $c$, $d$ to freely displace themselves on each other as ring $c$ may freely pivot around the pivots $t$. It is further obvious, that the windows $s$ may be provided in flanges $f$, $g$, the rollers $u$ being in this case arranged in flanges $h$, $i$.

Figs. 3 & 4 represent the elastic device for compensating the play caused by the wearing of the parts of the flanges which are in contact, which device operates without preventing ring d from assuming an inclined position with regard to the axle.

The two concentric rings c, d have no indentation m, n for the reception of projections of the elastic body e, and the taking along of one ring by the other is effected by friction, elastic body e being compressed by part d so that it is flattened and pressed against the flanges f, g. These flanges f, g are thicker and the balls l for facilitaing the sliding of one part on the other, are located in bearings x. The pivots t for the friction-rollers u are provided in the outer flanges h and i and the rollers u are located in recesses s of the inner flanges f, g.

The device for compensating the wearing of the parts consists of a ring y placed in the space k between flange g and the inner narrower end of ring d, said ring y serving as rolling-face for balls l. To compensate the wear produced by the diminution of the balls as well as of the parts on which they roll, a suitable number of spiral springs z are arranged parallel to the axle in convenient parts of ring d. The springs which bear with one end against a plate 2 rigidly fixed to ring d, press with their other ends the loose ring y against the balls 1, this pressure remaining uniform however great the wearing off of the balls or their rolling-faces may be. It is obvious, that these springs may be replaced by any other suitable device of known construction, which would produce the same effect without departing from the idea of the present invention. There could for example pads of india-rubber be inclosed in the recesses for the springs z, which pads could eventually be connected one with the other to form an elastic annular pad, or an air-chamber, such as used in bicycles, could be employed instead of the pads.

As shown in Fig. 4, the springs z can be made solidary with flanges f, g, for which purpose these flanges are furnished on their periphery at uniform distances apart from each other with boxes 5, open at the inner end and containing piston-like sliding-pieces 6, serving as bearings for the balls l. The springs z are inclosed between the side wall of the box and the closed end of the sliding-piece, so that the balls l are continuously pressed against the steel-plates 7, fixed on part d of the wheel. This device is easily mounted and offers further the advantage that the balls l are well lubricated. For this purpose it is only necessary, to fill the sliding-pieces 6 with lubricant and to provide a small perforation or perforations 8 in the closed end of said sliding-pieces for the passage of the lubricant to the balls.

To reduce the weight of the wheel, the flanges f, g must be made as thin as possible, for which purpose the ring d is cut away at the parts 11, (Fig. 5) at suitable intervals, cross-bolts 12 passing through said cut-away connecting and strengthening the front ends of flanges f, g.

To soften the disagreeable shocks which are produced by the sudden contact of rollers u with the edges of windows s, it is advisable to insert an elastic buffer between the pivots t and the edges of windows s or openings 12, which replace said windows. With this object in view, a spiral spring 13, (Fig. 6) is inserted between pivot t and the edges of the window, or, as shown in Figs. 6 & 7, the edges of the cut-aways 11 are lined with india-rubber as at 14, or, finally, the pivot t is provided with a sleeve 15 of india-rubber or other suitable material. In the latter cases it has to be considered that the linings 14 or the sleeve 15 must not be too thick so as to leave sufficient play for the pivot, as otherwise, when the pivot is close to the road, it might happen that it is unnecessarily brought into contact with the window-edge.

When there is provided only one pivot t, the play of the ring d in respect of the flanges and balls l could become too great; to prevent this, it is sufficient, to arrange on the periphery of the wheel several pivots t, for example three as shown in Fig. 6.

What I claim as my invention and desire to secure by Letters Patent, is:—

1. An elastic hub comprising two separate concentric rings, an elastic body interposed between said separate parts of the hub, so as to take the one part along with the other until a limited strain on the elastic body is reached, and a rigid device for taking along the one part of the hub with the other entering into effect when the limit of strain allowed for the elastic body has been surpassed, substantially as described and shown and for the purpose set forth.

2. An elastic hub comprising two separate concentric rings, an elastic body interposed between and connected with said separate parts, flanges projecting from the outer periphery of the inner ring and flanges projecting from the inner periphery of the outer ring overlapping the flanges of the inner ring, balls interposed between the flanges of the inner ring and the outer ring, and a device for uniformly pressing said balls on their rolling-face, substantially as described and shown and for the purpose set forth.

3. The flanges of the inner hub-ring having boxes at uniform distances apart from each other on their outer end, spiral springs in said boxes and cylinders open at their inner end inserted into the open ends of said boxes, balls on the outer surface of the closed end of said cylinders, and steel-plates fixed to the outer hub-ring serving as rolling-faces for the balls, substantially as described and shown.

4. The sliding-cylinders in the spring-boxes having perforations in the closed end for the passage of the lubricant to the balls.

5. The rigid device for taking up the strain on the elastic body when exceeding the limit, consisting of pivots screwed into the flanges of one hub-ring, rollers on said pivots and windows provided in the flanges of the other hub-ring for the reception of the rollers, substantially as described and shown and for the purpose set forth.

LOUIS ANTOINE GARCHEY.

Witnesses:
    ALFRED FREY,
    HENRI GUÉRIN